(12) United States Patent
Lim et al.

(10) Patent No.: US 8,274,953 B2
(45) Date of Patent: Sep. 25, 2012

(54) METHOD AND APPARATUS FOR TRANSMITTING FEEDBACK INFORMATION

(75) Inventors: Kwang-Jae Lim, Daejeon (KR); Chul-Sik Yoon, Seoul (KR); Jee-Hwan Ahn, Daejeon (KR)

(73) Assignees: Samsung Electronics Co., Ltd., Suwon-si (KR); Electronics & Telecommunications Research Institute, Daejeon (KR)

( * ) Notice: Subject to any disclaimer, the term of this patent is extended or adjusted under 35 U.S.C. 154(b) by 782 days.

(21) Appl. No.: 12/376,567

(22) PCT Filed: Jul. 31, 2007

(86) PCT No.: PCT/KR2007/003671
§ 371 (c)(1),
(2), (4) Date: Feb. 5, 2009

(87) PCT Pub. No.: WO2008/018710
PCT Pub. Date: Feb. 14, 2008

(65) Prior Publication Data
US 2010/0177740 A1 Jul. 15, 2010

(30) Foreign Application Priority Data
Aug. 10, 2006 (KR) .................. 10-2006-0075873
Feb. 2, 2007 (KR) .................. 10-2007-0011016

(51) Int. Cl.
*H04B 7/216* (2006.01)
(52) U.S. Cl. ........ 370/335; 370/252; 370/437; 370/465; 455/69
(58) Field of Classification Search .................. None
See application file for complete search history.

(56) References Cited

U.S. PATENT DOCUMENTS 6,115,354 A * 9/2000 Weck ......................... 370/203
2003/0156556 A1 8/2003 Puig-Oses et al.
(Continued)

FOREIGN PATENT DOCUMENTS

KR 10-2005-0087947 A 9/2005
(Continued)

OTHER PUBLICATIONS

IEEE P802.20/D2.1, Draft Standard for Local and Metropolitan Area Networks-Standard Air Interface for Mobile Broadband Wireless Access Systems Supporting Vehicular Mobility-Physical and Media Access Control Layer Specification, 2006, Institute of Electrical and Electronics Engineeers, Inc. New York, NY.

*Primary Examiner* — Chi Pham
*Assistant Examiner* — Mohammad Adhami
(74) *Attorney, Agent, or Firm* — Jefferson IP Law, LLP (57) ABSTRACT

Disclosed is an apparatus for transmitting feedback information to a base station. The feedback information transmitting apparatus receives channel allocation information, generates a plurality of payloads regarding feedback information, and multiplexes the plurality of payloads in terms of a plurality of classes so as to generate a plurality of multiplexed payloads. Subsequently, the plurality of multiplexed payloads are code multiplexed so as to generate a code division multiplexing symbol, and a channel code is applied to the code division multiplexing symbol. Then, the code division multiplexing signal applied with the channel code is transmitted to a base station through a wireless resource. Accordingly, a feedback channel that is adaptive to a channel condition is configured, such that a wireless resource for a feedback channel can be efficiently used.

13 Claims, 7 Drawing Sheets

U.S. PATENT DOCUMENTS

| | | |
|---|---|---|
| 2005/0180450 A1 | 8/2005 | Gaal et al. |
| 2005/0185738 A1* | 8/2005 | Gaikwad ..................... 375/340 |
| 2005/0201474 A1 | 9/2005 | Cho et al. |
| 2008/0014884 A1* | 1/2008 | Oyman et al. ............. 455/187.1 |
| 2008/0069031 A1* | 3/2008 | Zhang et al. ................... 370/328 |
| 2009/0175376 A1* | 7/2009 | Ihm et al. ..................... 375/267 |
| 2009/0268662 A1* | 10/2009 | Larsson et al. ................ 370/328 |

FOREIGN PATENT DOCUMENTS

| | | |
|---|---|---|
| KR | 10-2006-0092400 A | 8/2006 |
| WO | 2005/125020 A1 | 12/2005 |
| WO | 2006/043773 A2 | 4/2006 |

\* cited by examiner

```
                        P100
    Feedback channel allocation {
            Startframeindex : Uplink frame number with which feedback channel starts ~ P101
            Number of payload classes (C): The number of feedback payload classes ~ P103
    P105 ~ for c = 1 to c ≤ C {
            Power offset (ΔPc) : Power offset to be used for payload class c ~ P107
            Number of payload_c : The number of payloads to be multiplexed to payload class c ~ P109
        P111 ~ for t = 1 to t ≤ I {
                Pay load type (PLc) : Payload type ~ P113
                Period (Tc,t) : Payload feedback cycle ~ P115
            }
        }
    }
```

METHOD AND APPARATUS FOR TRANSMITTING FEEDBACK INFORMATION

TECHNICAL FIELD

The present invention relates to a method and apparatus for transmitting feedback information. In particular, the present invention relates to a method and apparatus for adaptively transmitting feedback information according to a channel environment of a mobile terminal.

BACKGROUND ART

The Draft Standard for OFDMA mobile communication standard enacted by IEEE 802.20, that is, IEEE P802.20/D2.1 Draft Standard for Local and Metropolitan Area Networks—Standard Air Interface for Mobile Broadband Wireless Access Systems Supporting Vehicular Mobility—Physical and Media Access Control Layer Specification, defines an uplink feedback channel that allows a mobile terminal to transmit feedback information to a base station in an uplink.

According to the Draft Standard, a mobile terminal cyclically transmits feedback information to a base station through an uplink feedback channel. The mobile terminal feeds back channel quality information, feedback information for multi-antenna transmission, and base station selection information to the base station on the basis of the feedback information. Then, the base station performs packet scheduling, adaptive modulation and coding scheme setting, antenna weighted value setting for multi-antenna transmission, and high-speed hand-off.

In the Draft Standard of IEEE 802.20, one mobile terminal multiplexes a plurality of feedback information sets using different scrambling codes and transmits the multiplexed feedback information through the feedback channel. At this time, a plurality of mobile terminals multiplex individual multiplexed feedback information sets using different scrambling codes and transmit the multiplexed feedback information through the same feedback channel.

Accordingly, a plurality of mobile terminals use the same wireless resource at the same transmission rate regardless of the channel conditions, which causes deterioration of efficiency of the wireless resource for the feedback channel.

Further, when transmitting various types of feedback information, the mobile terminal transmits the feedback information with the same processing gain and transmission power, and thus importance of individual feedback information is not distinguished.

In addition, since a cyclical feedback channel is allocated to feedback information that is intermittently fed back, the feedback channel is wastefully used.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method and apparatus for adaptively transmitting feedback information according to a channel environment of a mobile terminal.

Technical Solution

An exemplary embodiment of the present invention provides a method of transmitting feedback information to a base station, the method including receiving channel allocation information having a plurality of transmission cycles corresponding to each of a plurality of payloads regarding the feedback information and classification information regarding a plurality of classes to which the plurality of payloads belong, generating the plurality of payloads for the plurality of transmission cycles, multiplexing one or more payloads belonging to each of the plurality of classes for the each of the plurality of classes according to the classification information so as to generate a plurality of multiplexed payloads corresponding to each of the plurality of classes for every transmission cycle of each of the plurality of classes, applying a plurality of codes corresponding to each of the plurality of classes to the plurality of multiplexed payloads so as to generate a code division multiplexing symbol for every feedback cycle according to the transmission cycle of each of the plurality of classes, applying a scrambling code corresponding to a channel code to the code division multiplexing symbol, and transmitting the code division multiplexing symbol, to which the channel code is applied, to the base station through a wireless resource.

The channel allocation information may further include a plurality of transmission power information sets corresponding to each of the plurality of classes. In this case, the generating of the code division multiplexing symbol may comprise setting each of the plurality of classes so as to be transmitted according to the plurality of transmission power information sets.

The generating of the code division multiplexing symbol may include orthogonally modulating the plurality of multiplexed payloads so as to generate a plurality of orthogonally modulated multiplexed payloads corresponding to the plurality of multiplexed payloads, and applying the plurality of codes to each of the plurality of orthogonally modulated multiplexed payloads so as to generate a code division multiplexing symbol for every feedback cycle.

The generating of the plurality of orthogonally modulated multiplexed payloads may include expanding the plurality of multiplexed payloads to have the same length, thereby generating a plurality of expanded multiplexed payloads, and orthogonally modulating the plurality of expanded multiplexed payloads so as to generate the plurality of orthogonally modulated multiplexed payloads.

The method of transmitting feedback information according to the exemplary embodiment of the present invention may further include determining a predetermined number of repetitions by a ratio of the transmission cycle of each of the plurality of classes to the feedback cycle, and repeating the plurality of orthogonally modulated multiplexed payloads by the predetermined number of repetitions.

The method of transmitting feedback information according to the exemplary embodiment of the present invention may further include determining the transmission cycle of each of the plurality of classes with a minimum value among the transmission cycles of one or more payloads belonging to each of the plurality of classes.

The method of transmitting feedback information according to the exemplary embodiment of the present invention may further include determining the feedback cycle with a minimum value among the transmission cycles of the plurality of classes.

In the method of transmitting feedback information according to the exemplary embodiment of the present invention, the multiplexing of one or more payloads belonging to each of the plurality of classes includes determining the number of bits of each payload belonging to each of plurality of classes to be transmitted for every cycle of each of plurality of classes on the basis of the transmission cycles of one or more payloads belonging to each of plurality of classes and the transmission cycle of each of plurality of classes, and merging bits corresponding to the number of bits of the individual payloads among one or more bits constituting the individual payloads belonging to each of plurality of classes in terms of classes so as to generate the plurality of multiplexed payloads.

The determining of the number of bits may include determining the number of bits on the basis of a ratio of the transmission cycle of each of the one or more payloads belonging to each of plurality of classes and the transmission cycle of each of plurality of classes.

The plurality of payloads may include a non-cyclic payload, and a transmission cycle corresponding to the non-cyclic payload may represent a maximum report rate, in which the non-cyclic payload cannot be transmitted at an interval smaller than the corresponding transmission cycle. In this case, the method of transmitting feedback information according to the exemplary embodiment of the present invention may further include generating the non-cyclic payload on the basis of the transmission cycle corresponding to the non-cyclic payload, orthogonally modulating the non-cyclic payload, and applying an additional channel code to the orthogonally modulated non-cyclic payload and transmitting the orthogonally modulated non-cyclic payload applied with the additional channel code to the base station through the wireless resource.

The additional channel code may be a code that corresponds to the channel code and is obtained by conjugating or sign reserving the scrambling code corresponding to the channel code.

The plurality of payloads may include an indicator payload informing presence/absence of transmission of the non-cyclic payload.

The wireless resource may include a frame composed of a plurality of symbols on a time axis and a plurality of subcarriers on a frequency axis, and the code division multiplexing symbol applied with the channel code or the additional channel code is transmitted to the base station through a partial area of the frame. The transmitting may include sequentially dividing the code division multiplexing symbol applied with the channel code or the additional channel code so as to generate a plurality of divided symbols, and transmitting the plurality of divided symbols to the base station through different subcarriers.

Another exemplary embodiment of the present invention provides an apparatus for transmitting feedback information to a base station, the apparatus including a receiver, a payload generator, a bit multiplexer, a code multiplexer, a channel code application unit, and a transmitter. The receiver receives feedback channel allocation information having a plurality of transmission cycles corresponding to a plurality of payloads regarding the feedback information and classification information regarding a plurality of classes to which the plurality of payloads belong. The payload generator generates the plurality of payloads for the plurality of transmission cycles. The bit multiplexer multiplexes one or more payloads belonging to each of plurality of classes in terms of classes according to the classification information so as to generate a plurality of multiplexed payloads corresponding to the plurality of classes for every transmission cycle of the plurality of classes. The code multiplexer applies a plurality of codes corresponding to the plurality of classes to the plurality of multiplexed payloads so as to generate a code division multiplexing symbol for every feedback cycle according to the transmission cycle of the plurality of classes. The channel code application unit applies a scrambling code corresponding to a channel code to the code division multiplexing symbol so as to generate a channel code applied symbol. The transmitter transmits the channel code applied symbol to the base station through a wireless resource.

The channel allocation information may further include a plurality of transmission power information sets corresponding to the plurality of classes, and the code multiplexer may include a power controller that controls such that the plurality of classes are transmitted according to the plurality of transmission power information sets.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises", "comprising", "includes", and "including", when used herein, specify the presence of constituent elements, but do not preclude the presence or addition of other constituent elements.

In the exemplary embodiment of the present invention, the detailed description of the related art incorporated herein will be omitted when it may make the subject matter of the present invention unclear.

A method and apparatus for transmitting feedback information according to an exemplary embodiment of the present invention will now be described with reference to the drawings.

A feedback area according to an exemplary embodiment of the present invention will be described with reference to FIG. 1.

Figure 1:
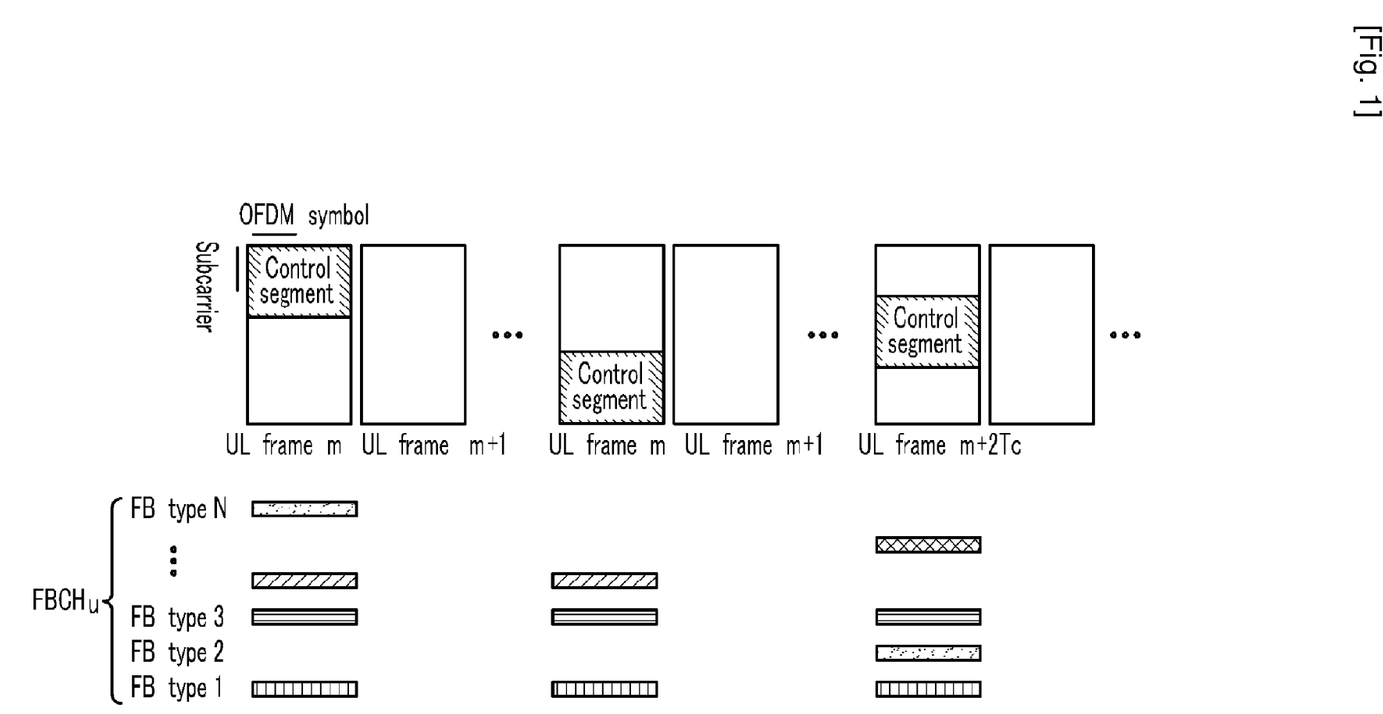
FIG. 1 is a diagram showing a feedback area assigned by a base station according to an exemplary embodiment of the present invention.

FIG. 1 is a diagram showing a feedback area assigned by a base station according to an exemplary embodiment of the present invention.

First, a base station assigns a feedback area for feedback channel transmission in an uplink frame on the basis of control information to be transmitted in a broadcasting channel or downlink frame. The interval of the feedback area can be defined by the number of uplink frames. In the present invention, the interval of the feedback area is defined as $T_{FB}$. The position of the feedback area may be changed for every uplink frame and is determined according to a predefined rule.

The feedback area has $N_{sub}$ successive subcarriers on the frequency axis and $N_{sym}$ successive OFDM symbols in a time domain. In the feedback area, D ($=N_{sym}N_{sub}$) subcarriers are used. The base station can expand the feedback area to an r-fold larger area in order to increase the number of usable feedback channels in the feedback area or reception performance. In this case, signals to be transmitted from the D subcarriers are repeated r times.

In the feedback area, a feedback channel for a mobile terminal is transmitted, and feedback channels for a plurality of mobile terminals are code division multiplexed in the same subcarrier by different scrambling codes and then transmitted.

Next, the base station transmits control information or a message having feedback channel allocation information in a downlink frame and allocates a feedback channel to a mobile terminal.

Next, feedback channel allocation information P100 according to an exemplary embodiment of the present invention will be described with reference to FIG. 2.

Figure 2:
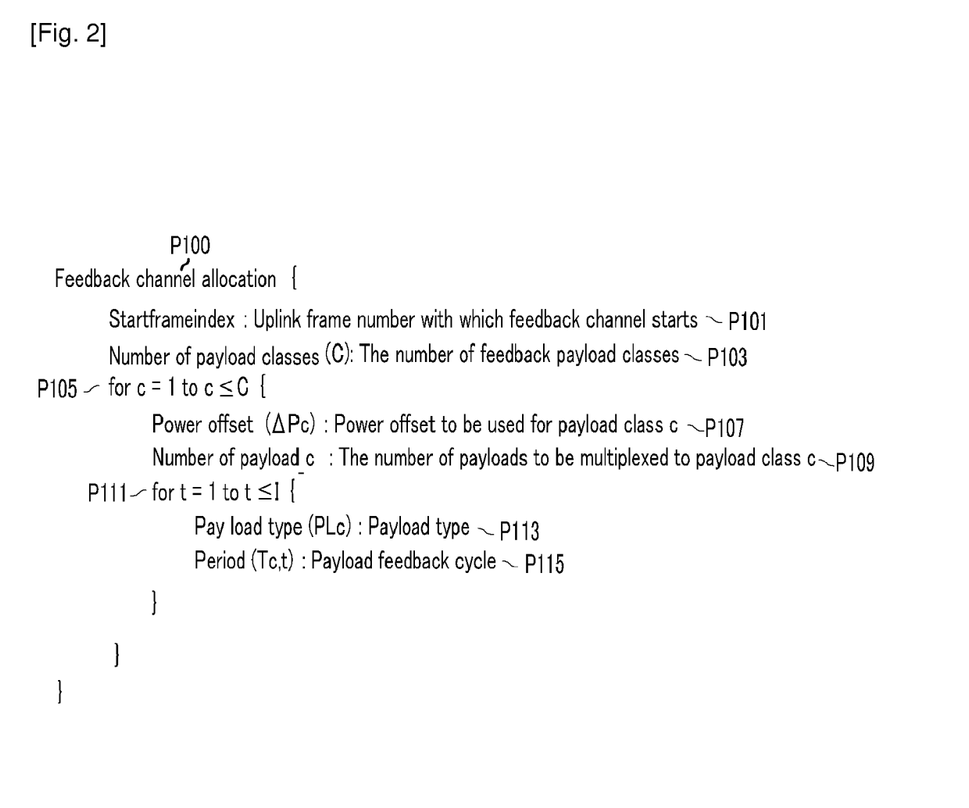
FIG. 2 is a diagram showing feedback channel allocation information according to an exemplary embodiment of the present invention.

FIG. 2 is a diagram showing feedback channel allocation information according to an exemplary embodiment of the present invention.

As shown in FIG. 2, feedback channel allocation information P100 according to an exemplary embodiment of the present invention has an uplink frame number P101, the number of payload classes P103, and payload class information P105 corresponding to the number of payload classes P103. Payload class information P105 corresponding to a payload class c has a power offset to be used for the payload class c, the number of payloads P109 to be multiplexed to the payload class c, and payload information P111 corresponding to the number of payloads. Payload information P111 corresponding to a payload t has the payload type P113 of the payload t and a feedback cycle P115 of the payload t.

The base station allocates a single feedback channel to each mobile terminal on the basis of the feedback channel allocation information P100. The mobile terminal multiplexes various types of payloads on the basis of the feedback channel allocation information P100 and feeds back the multiplexed payloads to the base station. At this time, a feedback channel that is allocated to a mobile terminal may have one or more feedback classes, and the individual feedback classes may have various types of payloads.

The payloads to be multiplexed to a single payload class are determined by the payload type P113 of the feedback channel allocation information P100. At this time, the number of bits $B_{c,t}$ constituting the individual payloads and the meanings of payload bits are predefined according to the individual payload types P113. The base station defines feedback cycles $T_{c,t}$ P115 of the individual payload types P113 on the basis of the feedback channel allocation information P100. The mobile terminal multiplexes a plurality of payloads to a single payload class according to the feedback cycles P115.

At this time, the base station classifies the payloads such that the payloads requiring the same processing gain and transmission power are multiplexed to a single payload class. The mobile terminal multiplexes the payloads belonging to the same payload class for the purpose of the same reception performance. In this case, however, the payloads belonging to the same payload class may have different feedback cycles.

The mobile terminal can multiplex the individual payload classes such that different payload classes use different processing gains and transmission power. At this time, the mobile terminal code division multiplexes different payload classes through different scrambling codes. The processing gain means the number of subcarriers to be used per payload bit. When a payload class c having $F_c$ bits is allocated to be repeatedly transmitted using $N_{sub}N_{sym}$ subcarriers in the feedback area during $R_c$ uplink frames, the processing gain $PG_c$ is represented by Equation 1.

$$PG_c = N_{sub}N_{sym}R_c/F_c \quad \text{(Equation 1)}$$

According to Equation 1, if the processing gain $PG_c$ is large, it means that a wireless resource to be used per bit is large. As a result, the payload detection performance in the base station is increased.

The transmission power of the payload class is determined by the power offset P107 relative to each class with respect to reference transmission power of the feedback channel. When a reference transmission power density for a feedback channel of a mobile terminal is $P_{FB}$, and the power offset allocated to the payload class c is $DP_c$, a transmission power density $P_c$ of the payload class c is represented by Equation 2.

$$P_c = P_{FB} + \Delta P_c \quad \text{(Equation 2)}$$

The reference transmission power for the feedback channel of each mobile terminal is determined by open-loop power control or close-loop power control. The detailed method of setting the reference transmission power departs from the subject matter of the present invention, and thus the description thereof will be omitted.

As such, the individual payload classes can have different reception performance by allocating different processing gains and transmission power to the individual payload classes. For example, channel quality information and a response to a HARQ (Hybrid Automatic Repeat Request) burst may be defined by different payload classes, and the relatively large number of subcarriers per bit and relatively large transmission power may be allocated to the response to the HARQ burst so as to have high reception performance.

The mobile terminal multiplexes a plurality of feedback payloads according to the feedback channel allocation information P100 transmitted from the base station and transmits the multiplexed feedback payloads through the feedback channel allocated to the mobile terminal. A step through which the mobile terminal multiplexes the payloads has two substeps of bit level multiplexing the payloads belonging to a single payload class and code division multiplexing different feedback classes.

Next, a mobile terminal 100 according to an exemplary embodiment of the present invention will be described with reference to FIG. 3.

Figure 3:
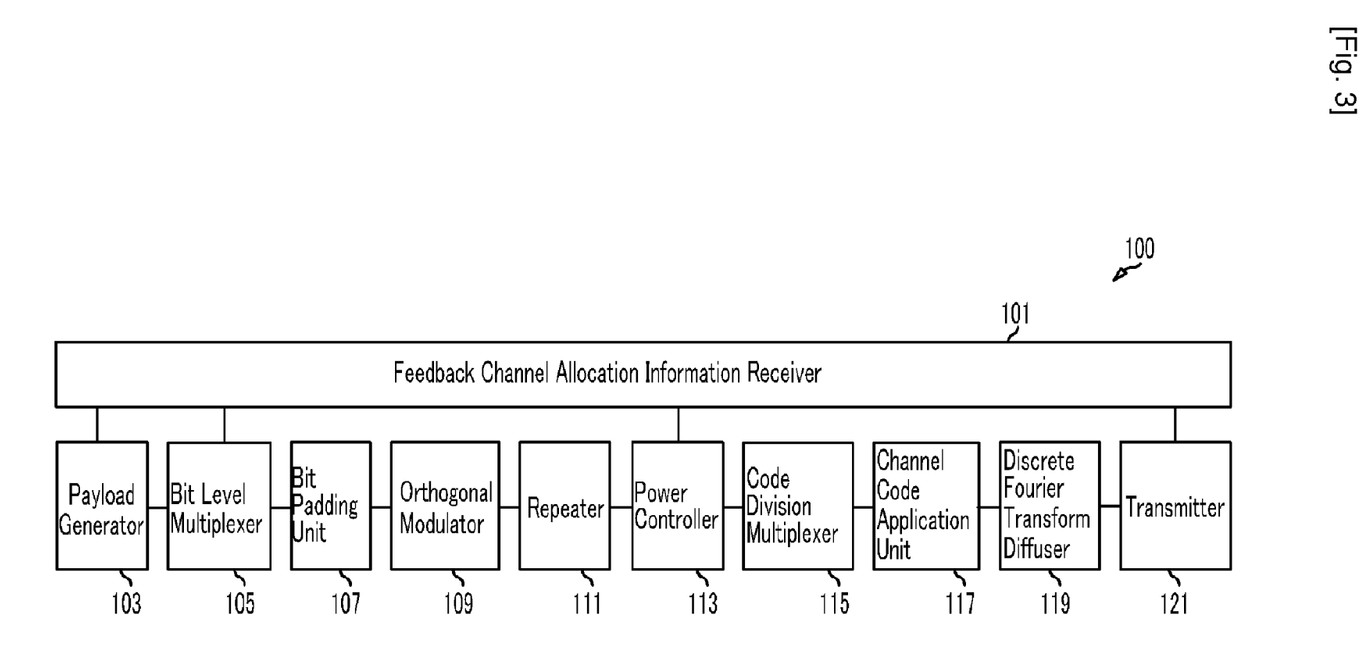
FIG. 3 is a block diagram showing a mobile terminal according to an exemplary embodiment of the present invention.

FIG. 3 is a block diagram showing the mobile terminal 100 according to an exemplary embodiment of the present invention.

As shown in FIG. 3, the mobile terminal according to an exemplary embodiment of the present invention includes a feedback channel allocation information receiver 101, a payload generator 103, a bit level multiplexer 105, a bit padding unit 107, an orthogonal modulator 109, a repeater 111, a power controller 113, a code division multiplexer 115, a channel code application unit 117, a discrete Fourier transform (DFT) diffuser 119, and a transmitter 121.

The feedback channel allocation information receiver 101 receives the feedback channel allocation information P100 from the base station.

The payload generator 103 receives the payload type P113 and the payload feedback cycle P115 of the feedback channel allocation information P100 from the feedback channel allocation information receiver 101, and generates payloads corresponding to the received payload type P113 for every payload feedback cycle P115.

The bit level multiplexer 105 receives a plurality of payloads from the payload generator 103, classifies the plurality of payloads in terms of payload classes according to the feedback channel allocation information P100 from the feedback channel allocation information receiver 101, and performs bit level multiplexing in terms of payload classes so as to generate multiplexed payloads.

The bit padding unit 107 receives the multiplexed payloads for the individual payload classes from the bit level multiplexer 105, and performs bit padding on the multiplexed payloads so as to generate bit-padded multiplexed payloads.

The orthogonal modulator 109 orthogonally modulates the bit-padded multiplexed payloads through orthogonal modulation codes so as to generate orthogonally modulated multiplexed payloads.

The repeater 111 repeatedly transmits the orthogonally modulated multiplexed payloads according to the cycle of each payload class.

The power controller 113 sets the transmission power of each payload class using the power offset P107 of each payload class defined in the feedback channel allocation information P100. The transmission power in terms of payload classes is determined by the power offset with respect to the reference transmission power of the feedback channel, and the transmission power in terms of payload classes is represented by Equation 2 described above.

The code division multiplexer 115 scrambles different payload classes through different scrambling codes so as to generate a code division multiplexing symbol. The scrambling code to be used for every payload class is predefined. At this time, the scrambling codes of the payload classes that are sequentially predefined according to a sequence in the feedback channel allocation information are used. The scrambling code may be predefined by an ID allocated to the mobile terminal or an ID of the feedback channel, as well as a sector ID, a frame number, and an OFDM symbol number.

The channel code application unit 117 applies a channel code for the mobile terminal 100 to the code division multiplexing symbol so as to generate a channel code applied symbol. At this time, the channel code application unit 117 can apply a scrambling code corresponding to the channel code to the code division multiplexing symbol. The scrambling code corresponding to the channel code may be predefined by the ID allocated to the mobile terminal or the ID of the feedback channel, as well as the sector ID, the frame number, and the OFDM symbol number.

The DFT diffuser 119 receives the channel code applied symbol from the channel code application unit 117 so as to generate a DFT diffusion symbol for discrete Fourier transform (DFT) diffusion.

The transmitter 121 transmits the DFT diffusion symbol through the $N_{sub}N_{sym}$ subcarriers of the feedback area. At this time, the transmitter 121 transmits a chip sequence Y having $N_{sub}$ chips through $N_{sub}$ subcarriers of each OFDM symbol in the feedback area. The transmitter 121 transmits the DFT diffusion symbol to the base station through the feedback area of a frame, with which the feedback channel starts, according to the uplink frame number P101 of the feedback channel allocation information P100.

Next, a method through which the mobile terminal 100 feeds back the payloads to the base station according to an exemplary embodiment of the present invention will be described with reference to FIG. 4.

Figure 4:
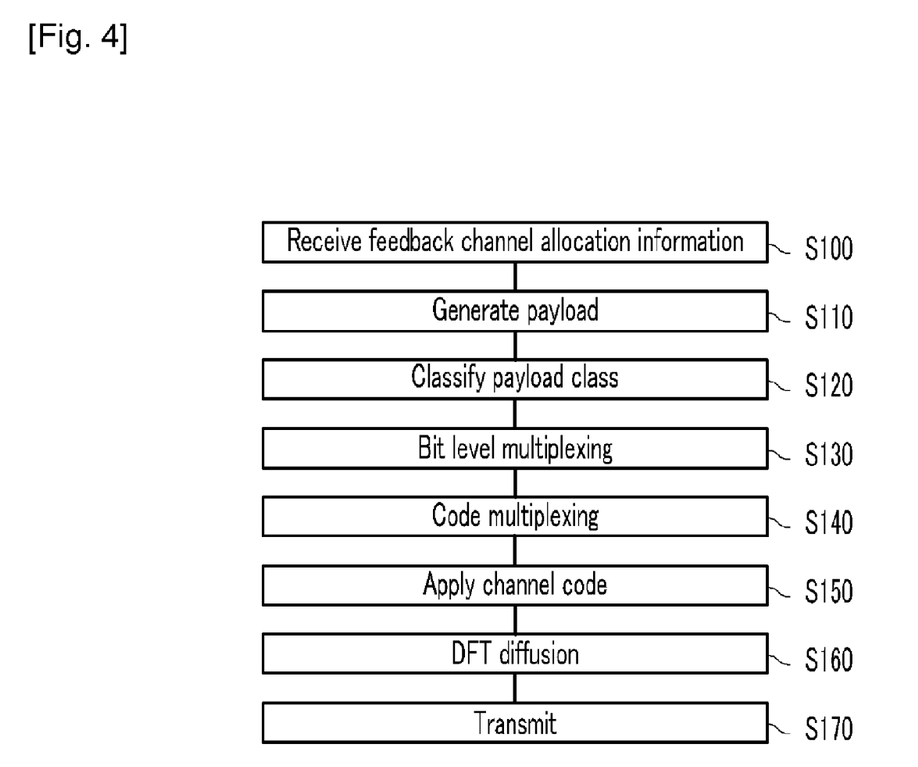
FIG. 4 is a flowchart showing a procedure through which a mobile terminal feeds back a payload to a base station according to an exemplary embodiment of the present invention.

FIG. 4 is a flowchart showing a procedure through which the mobile terminal 100 feeds back the payloads to the base station according to an exemplary embodiment of the present invention.

As shown in FIG. 4, first, the feedback channel allocation information receiver 101 of the mobile terminal 100 receives the feedback channel allocation information P100 from the base station (Step S100).

Next, the payload generator 103 receives the payload type P113 and the payload feedback cycle P115 from the feedback channel allocation information receiver 101, and generates a plurality of payloads corresponding to the received payload type P113 for every feedback cycle P115 of the payload (Step S110).

Subsequently, the bit level multiplexer 105 receives the plurality of payloads from the payload generator 103 and also receives the feedback channel allocation information P100 from the feedback channel allocation information receiver 101. Then, the bit level multiplexer 105 classifies the plurality of payloads into a plurality of payload classes according to the number of payload classes P103 and the payload class information P105 of the feedback channel allocation information P100 (Step S120).

Next, the bit level multiplexer 105 performs bit level multiplexing in terms of payload classes so as to generate multiplexed payloads (Step S130).

Hereinafter, a process in which the bit level multiplexer 105 multiplexes a plurality of payloads $PL_{c,1}$, $PL_{c,2}$, and $PL_{c,3}$, which are classified into a single payload class (the payload class c), to a single multiplexed payload will be described with reference to FIG. 5.

Figure 5:
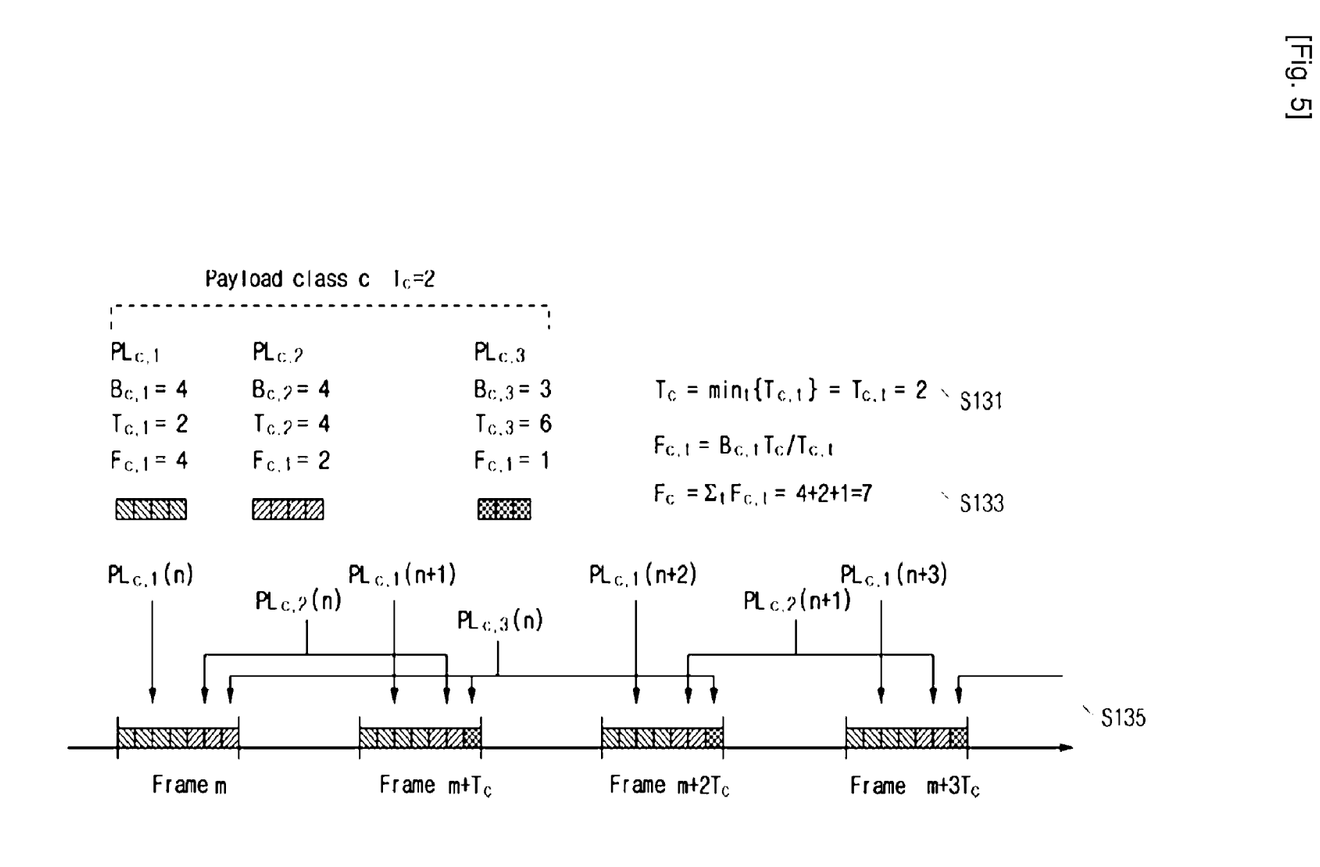
FIG. 5 is a flowchart showing a procedure through which a bit level multiplexer multiplexes a plurality of payloads according to an exemplary embodiment of the present invention.

FIG. 5 is a flowchart showing a procedure through which the bit level multiplexer 105 multiplexes a plurality of payloads according to an exemplary embodiment of the present invention.

As shown in FIG. 5, the bit level multiplexer 105 performs bit level multiplexing on a plurality of payloads on the basis of the feedback cycle $T_{c,t}$ of each payload and the bit length $B_{c,t}$. The feedback cycle $T_{c,t}$ is defined by the payload feedback cycle P115 of feedback channel allocation information P100, and the bit length $B_{c,t}$ is predefined according to the payload type ($PL_{c,t}$) P113.

First, the bit level multiplexer 105 determines the smallest feedback cycle among the feedback cycles $T_{c,1}$, $T_{c,2}$, and $T_{c,3}$ of the payloads $PL_{c,1}$, $PL_{c,2}$, and $PL_{c,3}$ belonging to the payload class (the payload class c) as the cycle $T_c$ of the payload class (the payload class c) (Step S131). That is, the cycle of the payload class (the payload class c) becomes two frames.

Next, the bit level multiplexer 105 determines the number of bits $F_{c,t}$ to be transmitted for every class cycle relative to each payload t on the basis of the cycle $T_c$ of the payload class (Step S133). The number of bits $F_{c,t}$ is represented by Equation 3.

$$F_{c,t}=B_{c,t}T_c/T_{c,t} \quad \text{(Equation 3)}$$

According to Equation 3, $B_{c,t}$ bits constituting the payload relative to the payload type t are multiplexed together with different payloads so as to be transmitted over the frames corresponding to the allocated payload cycle $T_{c,t}$. That is, since the feedback cycle $T_{c,1}$ of the payload is consistent with the cycle $T_c$ of the payload class, the number of bits $F_{c,1}$ of the payload $PL_{c,1}$ becomes the original payload length 4 according to Equation 3. Since the feedback cycle $T_{c,2}$ of the payload is twice as large as the cycle $T_c$ of the payload class, the number of bits $F_{c,2}$ of the payload $PL_{c,2}$ becomes 2 according to Equation 3. Similarly, since the feedback cycle $T_{c,3}$ of the payload is three times as large as the cycle of the payload class, the number of bits $F_{c,3}$ of the payload $PL_{c,3}$ becomes 1 according to Equation 3.

At this time, when the number of payloads belonging to the payload class is one, the payload class is composed of a single type of payload. That is, the cycle of the payload class becomes the feedback cycle of the single payload, and the multiplexed payload of the payload class becomes the single payload itself.

When allocating a feedback channel for a mobile terminal 100, the base station appropriately sets the payload type ($PL_{c,t}$) P150 belonging to the payload class and the feedback cycle ($T_{c,t}$) P160 such that the number of bits $F_{c,t}$ to be transmitted for every class cycle becomes a natural number, if possible. Further, when it is difficult to allocate the feedback channel such that the number of bits $F_{c,t}$ becomes a natural number, the base station may define the corresponding payload in a different payload class.

Further, the base station may allocate the feedback channel such that the number of bits $F_{c,t}$ does not become a natural number. In this case, the bit level multiplexer 101 of the mobile terminal 100 adds $DB_{c,t}$ '0' bits in the rear of the original payload bit. The number of bits $DB_{c,t}$ to be added is represented by Equation 4.

$$\Delta B_{c,t} = \lceil B_{c,t} T_c / T_{c,t} \rceil T_c / T_{c,t} - B_{c,t} \quad \text{(Equation 4)}$$

According to Equation 4, the bit level multiplexer 105 adds $DB_{c,t}$ '0' bits to the payload having the bit length of $B_{c,t}$ so as to create a payload having $B_{c,t}'$ bits and then performs bit level multiplexing on the created payload. $B_{c,t}'$ is represented by Equation 5.

$$B_{c,t}' = B_{c,t} + \Delta B_{c,t} \quad \text{(Equation 5)}$$

Next, the bit level multiplexer 105 sequentially binds $F_{c,t}$ bits among the bits constituting each payload according to the sequence of the payload types P113 in the feedback channel allocation information P100 so as to generate bit sequences of multiplexed payloads for the payload class (the payload class c) (Step S135). The length $F_c$ of each of the bit sequences of the multiplexed payloads for the payload class is represented by Equation 6.

$$F_c = \Sigma_t \{F_{c,t}\} \quad \text{(Equation 6)}$$

According to Equation 6, the bit level multiplexer 105 transmits $F_c$ bits for every cycle $T_c$ of the payload class for the payload class (the payload class c). That is, the bit level multiplexer 105 sequentially binds four bits corresponding to the number of bits $F_{c,1}$ among four bits constituting the payload $PL_{c,1}$, two bits corresponding to the number of bits $F_{c,2}$ among four bits constituting the payload $PL_{c,2}$, and one bit corresponding to the number of bits $F_{c,3}$ among three bits constituting the payload $PL_{c,3}$ so as to generate the multiplexed payloads for the payload class (the payload class c). Each multiplexed payload is composed of seven bits according to Equation 6. Then, each multiplexed payload is transmitted through the feedback channel for every two frames, that is, the cycle $T_c$ of the payload class (the payload class c).

The mobile terminal 100 forms each multiplexed payload corresponding to the payload class according to the feedback channel allocation information P100 transmitted by the base station. Accordingly, the base station can form the original payload bits belonging to the payload class again from the received multiplexed payload. That is, the base station can reversely restore the payload in terms of the payload classes to the bit level multiplexing process of the payload class in the mobile terminal 100.

Returning to FIG. 4, the method through which the mobile terminal 100 feeds back the payloads to the base station according to an exemplary embodiment of the present invention will be described.

After performing bit padding, orthogonal modulation, and symbol repetition processes on the multiplexed payloads of each payload class formed by the bit level multiplexing process, the mobile terminal 100 performs code multiplexing (code division multiplexing) by different scrambling codes (Step S140).

Hereinafter, a process through which the mobile terminal 100 performs code multiplexing according to an exemplary embodiment of the present invention will be described with reference to FIG. 6.

Figure 6:
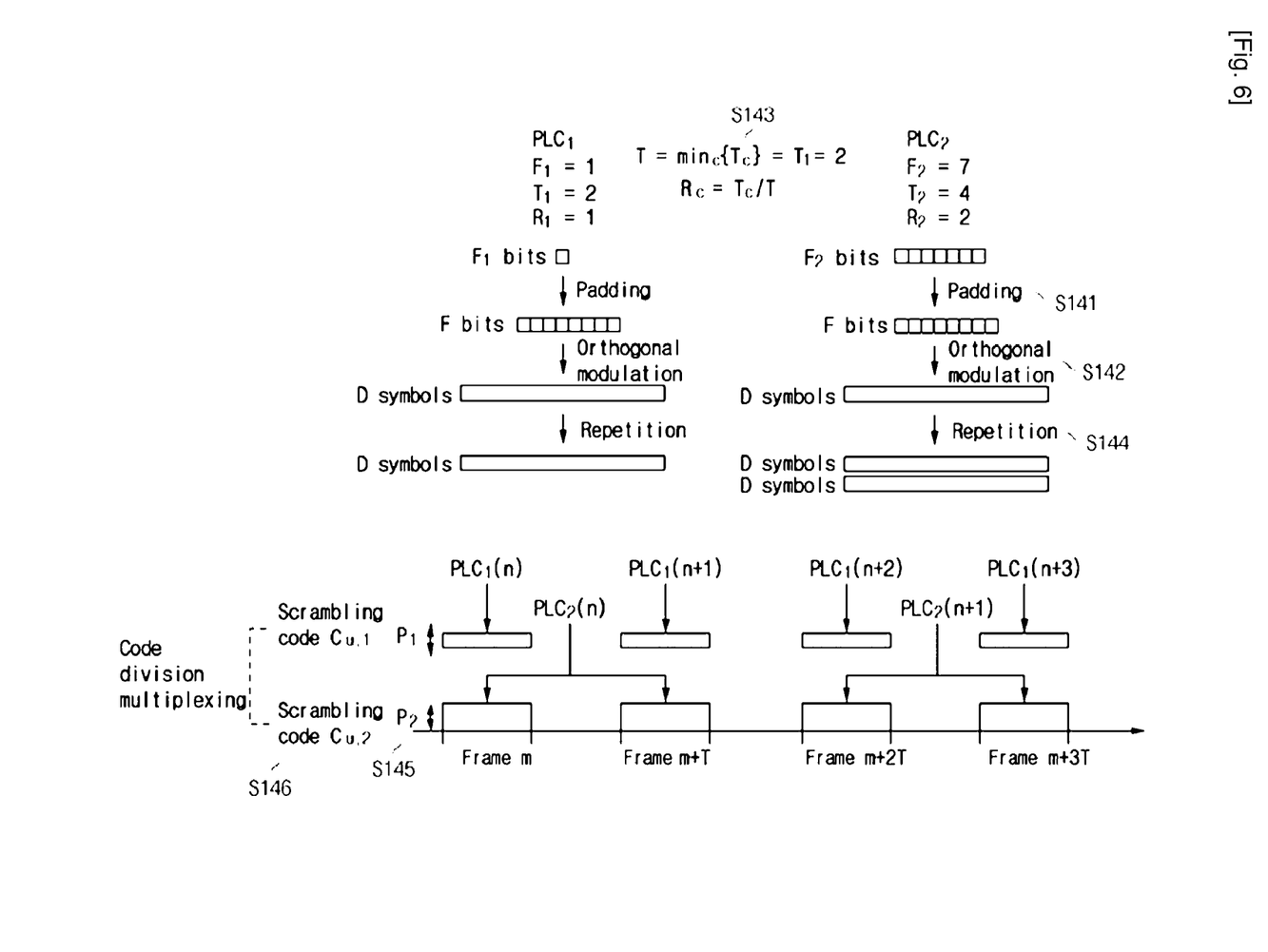
FIG. 6 is a flowchart showing a procedure through which a mobile terminal performs code multiplexing according to an exemplary embodiment of the present invention.

FIG. 6 is a flowchart showing a procedure through which the mobile terminal 100 performs code multiplexing according to an exemplary embodiment of the present invention.

As shown in FIG. 6, the mobile terminal 100 performs code multiplexing on two types of payload classes $PLC_1$ and $PLC_2$. Here, it is assumed that, when the length F of the bit sequence in the orthogonal modulation process is 8, code multiplexing is performed on the payload classes.

First, the bit padding unit 107 receives the multiplexed payloads of the individual payload classes from the bit level multiplexer 105, and performs bit padding on the received multiplexed payloads (Step S141). The bit padding unit 107 adjusts the bit length of each of the multiplexed payload to predefined F bits. If each of the multiplexed payloads of the individual payload classes has $F_c$ ($\leq F$) bits, (F-$F_c$) '0' bits are added in the rear of each multiplexed payload so as to expand to F bits. The bit padding process (Step S141) is a process of equalizing the bit lengths of the multiplexed payloads of all of the payload classes as F bits. That is, the bit padding unit 107 pads 7 '0' bits to the multiplexed payload $PLC_1$ having one ($F_1$) bit so as to expand to eight (F) bits. Similarly, the bit padding unit 107 pads one '0' bit to the multiplexed payload $PLC_2$ having seven ($F_2$) bits so as to expand to eight (F) bits.

Next, the orthogonal modulator 109 converts each of the bit-padded multiplexed payloads into one of the D discrete Fourier transform (DFT) codes having the length of D chips (Step S142). The DFT code corresponding to the content of the bit sequence is predefined.

In the DFT code, the j-th chip of the i-th DFT code is represented by Equation 7.

$$m_{i,j} = A \exp(2\pi i j / L) \quad \text{(Equation 7)}$$

where
A=(the amplitude of the DFT code chip)
$L = N_{sub} N_{sym}$
i=0, 1, 2, . . . , L−1
j=0, 1, 2, . . . , L−1

A single DFT code is transmitted in the feedback area of a single uplink frame, and the D chips constituting the DFT code are transmitted in D subcarriers. That is, the orthogonal modulator 109 converts the bit-padded multiplexed payload into the DFT code having the length of D chips corresponding to the content of each bit sequence.

Subsequently, the repeater 111 determines the minimum value among the payload classes as the feedback cycle T of the mobile terminal 100 (Step S143). That is, the cycle of the feedback channel becomes two frames since the cycle of the payload class $PLC_1$ is the minimum.

Next, the repeater 111 allows the orthogonally modulated DFT code to be repeatedly transmitted in various kinds of uplink frames according to the cycle of the payload class (Step S144). The repeater 111 determines the number of repetitions $R_c$ of the payload class on the basis of the cycle of the payload class and the cycle of the feedback channel. At this time, the number of repetitions $R_c$ relative to each payload class is represented by Equation 8.

$$R_c = T_c / T \qquad \text{(Equation 8)}$$

According to Equation 8, the repeater 111 repeatedly transmits the orthogonally modulated DFT code $R_c$ times at an interval of T frames as the cycle of the feedback channel during $T_c$ frame as the feedback cycle of the payload class. At this time, when allocating a feedback channel for a mobile terminal 100, the base station can appropriately set the cycle $T_c$ of each feedback class such that the number of repetitions $R_c$ becomes a natural number. That is, the repeater 111 repeats the DFT code corresponding to the payload class $PLC_1$ such that it is transmitted in a single frame according to Equation 8. Similarly, the repeater 111 repeats the DFT code corresponding to the payload class $PLC_2$ such that it is transmitted in two frames according to Equation 8.

Subsequently, the power controller 113 determines the transmission power relative to the payload class using the power offset of each payload class in the feedback channel allocation information and controls such that each payload class is transmitted with the corresponding transmission power (Step S145). The transmission power in terms of payload classes is determined by the power offset with respect to the reference transmission power of the feedback channel. The transmission power in terms of payload classes is represented by Equation 2 described above.

Next, the code division multiplexer 115 code division multiplexes different payload classes through different scrambling codes so as to generate code division multiplexing symbols (Step S146). The scrambling code to be used for every payload class is predefined. At this time, the scrambling codes of the payload classes that are sequentially predefined according to the sequence in the feedback channel allocation information P100 are used. The scrambling code may be predefined by the ID allocated to the mobile terminal or the ID of the feedback channel, as well as the sector ID, the frame number, and the OFDM symbol number. That is, the code division multiplexer 115 scrambles the DFT code corresponding to the payload class $PLC_1$ using a first code among the predefined scrambling codes of the payload classes. Similarly, the code division multiplexer 115 scrambles the DFT code corresponding to the payload class $PLC_2$ using a second code among the predefined scrambling codes of the payload classes.

The processing gain PG relative to the payload class $PLC_1$ is $PG_1 = R_1 D / F_1 = D$ according to Equation 1, and the processing gain $PG_2$ relative to the payload class $PLC_2$ is $PG_2 = R_2 D / F_2 = 2D/7$ according to Equation 1. Since $PG_1 > PG_2$, it can be seen that, if the same transmission power is allocated, high reception performance relative to the payload class $PLC_1$ is allocated.

Returning to FIG. 4, the method through which the mobile terminal feeds back the payloads to the base station according to an exemplary embodiment of the present invention will be described.

The channel code application unit 117 scrambles D code division multiplexing symbols for every cycle of the feedback channel by the scrambling code corresponding to the channel code for the feedback channel of the mobile terminal (Step S150). The scrambling code corresponding to the channel code may be predefined by the ID allocated to the mobile terminal or the ID of the feedback channel, as well as the sector ID, the frame number, and the OFDM symbol number.

Next, the DFT diffuser 119 converts the symbol sequence having D chips into another symbol sequence having D chips (Step S160). The symbol sequence having D chips is sequentially divided into sequences (X) having $N_{sub}$ chips, and the number of divided chip sequences becomes $N_{sym}$ ($=D/N_{sub}$). The DFT diffuser 119 sequentially DFT-diffuses the $N_{sym}$ divided sequences in $N_{sym}$ OFDM symbols. At this time, the divided chip sequence (X) having N chips is DFT-diffused into a chip sequence (Y) having $N_{sub}$ chips. The chip sequence (Y) is represented by Equation 9.

$$y_i = \frac{1}{\sqrt{N_{sub}}} \sum_{k=0}^{N_{sub}-1} x_k \exp(-j2\pi(k - N_{sub}/2)i/N_{sub}) \qquad \text{(Equation 9)}$$

where
$N_{sub} = D/N_{sym}$
$X = x_0, x_1, \ldots, x_{sub-1}$
$Y = y_0, y_1, \ldots, y_{sub-1}$ Subsequently, the transmitter 121 transmits the DFT-diffused symbols to the base station through $N_{sub}N_{sym}$ subcarriers in the feedback area (Step S170). The transmitter 121 transmits the chip sequence (Y) having $N_{sub}$ chips through $N_{sub}$ subcarriers of each OFDM symbol in the feedback area.

Next, a method through which the mobile terminal 100 feeds back a non-cyclic payload to the base station according to an exemplary embodiment of the present invention will be described with reference to FIG. 7.

Figure 7:
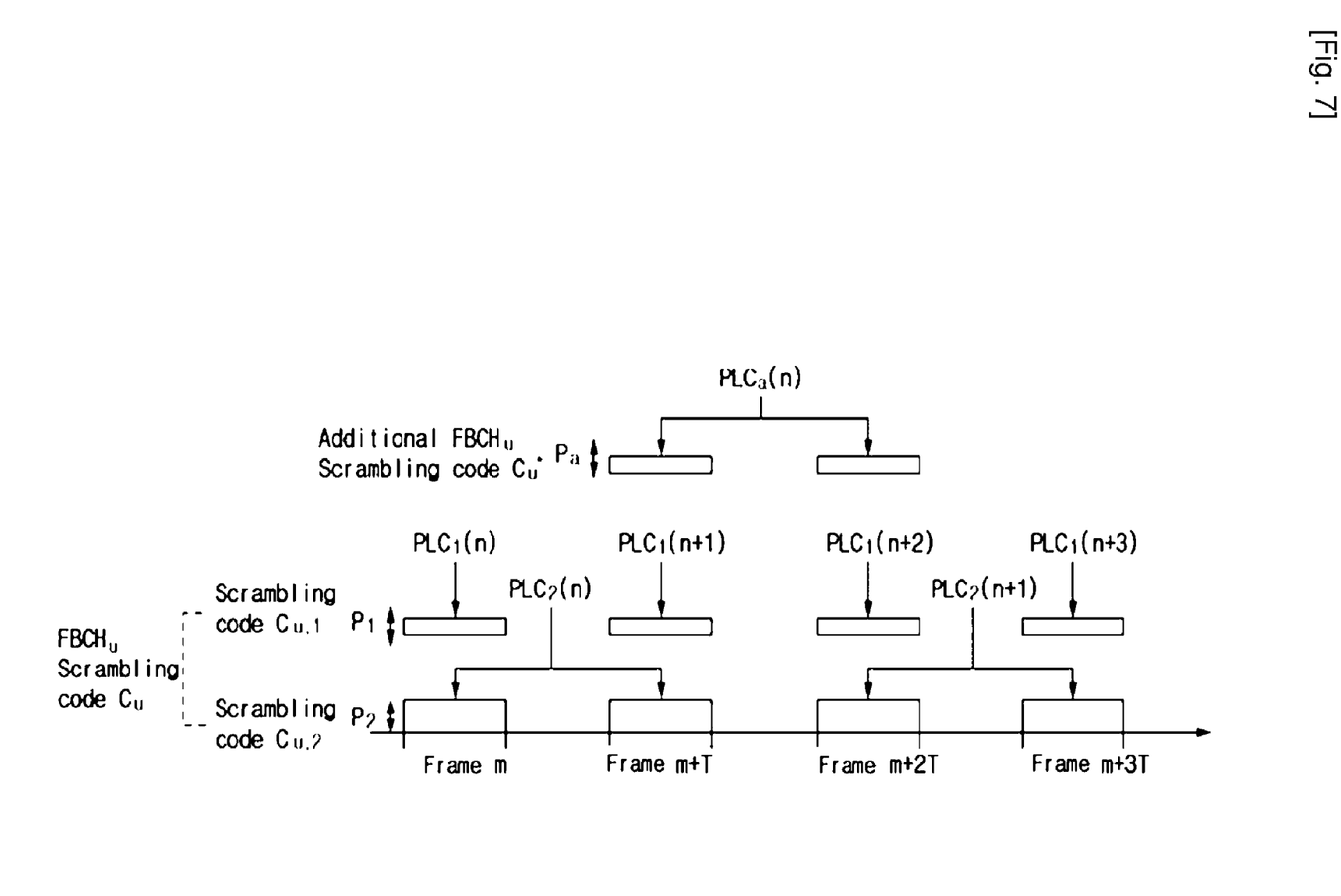
FIG. 7 is a diagram showing a method through which a mobile terminal feeds back a non-cyclic payload to a base station according to an exemplary embodiment of the present invention.

FIG. 7 is a diagram showing a method through which the mobile terminal 100 feeds back a non-cyclic payload to the base station according to an exemplary embodiment of the present invention.

With respect to feedback information that needs to be fed back intermittently, not cyclically, the mobile terminal 100 can use an additional feedback channel to be inter-mittently transmitted, instead of the cyclic feedback channel.

The base station uses the feedback channel allocation information P100 in order to allow the mobile terminal 100 to transmit non-cyclic feedback information, and predefines a specific payload type as a non-cyclic payload in order to transmit the non-cyclic feedback information. The base station defines a specific payload class of the feedback channel allocation information P100 to include a non-cyclic payload, and also defines a power offset P107 of a payload class including the non-cyclic payload and a feedback cycle P115 of the non-cyclic payload.

The feedback cycle defined for the non-cyclic payload means the restriction of the maximum report rate capable of transmitting the non-cyclic payload, not an actual cyclic feedback cycle. That is, the payload generator 103 receives a payload type P113 and a payload feedback cycle P115 corresponding to the non-cyclic payload from the feedback channel allocation information receiver 101, and generates the non-cyclic payload on the basis of the payload feedback cycle P115 corresponding to the non-cyclic payload. For example, when the feedback cycle of ten frames is defined for the non-cyclic payload in the feedback channel allocation information P100, it means that the non-cyclic payload cannot be transmitted at an interval smaller than ten frames. This restriction is used to restrict interference from being increased due to transmission of the non-cyclic payload.

As shown in FIG. 7, the mobile terminal 100 applies a channel scrambling code $C_u$ to payload classes $PLC_1$ and $PLC_2$, to which a payload having a predetermined cycle belongs, and transmits the payload to the base station through a basic feedback channel ($FBCH_u$). Meanwhile, the mobile terminal applies a scrambling code Cu* for an additional feedback channel to a payload class $PLC_a$, to which a non-cyclic payload belongs, and transmits the non-cyclic payload to the base station through an additional feedback channel (Additional $FBCH_u$).

The scrambling code for the additional feedback channel may be a code obtained by conjugating or sign reversing the scrambling code used to transmit the basic feedback channel, or may be a predefined code corresponding to the scrambling code of the basic feedback channel one-to-one.

After the orthogonal modulation process and the frame repetition process on the class to which the non-cyclic payload belongs, the mobile terminal 100 applies the scrambling code for the additional feedback channel.

When needing to transmit the non-cyclic payload, the mobile terminal 100 transmits the non-cyclic payload using the additional feedback channel. Accordingly, the base station can allow a transmission indicator indicating the transmission of the non-cyclic payload to be cyclically transmitted in the basic feedback channel.

To this end, the base station can add the non-cyclic transmission indicator to a specific feedback class in the feedback channel allocation information P100 and can define the cycle thereof. At this time, the type of feedback for the non-cyclic transmission indicator may be predefined, and a payload as the non-cyclic transmission indicator may have a bit length of one bit.

When needing to transmit the non-cyclic payload, the mobile terminal 100 notifies the base station of the transmission of the non-cyclic payload through the payload as the non-cyclic transmission indicator, and transmits the non-cyclic payload in a frame during which the payload as the non-cyclic transmission indicator is transmitted or in a frame of the next feedback channel through the additional feedback channel. A time interval between the frame during which the non-cyclic transmission indicator is transmitted and the frame during which the additional feedback channel including an actual non-cyclic payload is transmitted is predefined.

If it is determined according to the content of the payload as the non-cyclic transmission indicator that the non-cyclic payload is transmitted, the base station receives the additional feedback channel for the mobile terminal 100 in a frame during which the payload as the non-cyclic transmission indicator is received or in a frame of the next feedback channel.

The above-described exemplary embodiment of the present invention is not implemented by only the method and the apparatus, but it may be implemented by a program for executing the functions corresponding to the configuration of the exemplary embodiment of the present invention or a recording medium having the program recorded thereon. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the present invention described above, the mobile terminal can configure an adaptive feedback channel according to a channel condition and a feedback requirement. Accordingly, a wireless resource for a feedback channel can be efficiently used.

According to the present invention, the mobile terminal can effectively multiplex various types of feedback payloads that require different feedback cycles and reliability.

The invention claimed is:

1. A method of transmitting feedback information to a base station, the method comprising:
   receiving channel allocation information having a plurality of transmission cycles corresponding to each of a plurality of payloads regarding the feedback information and classification information regarding a plurality of classes to which the plurality of payloads belong;
   generating the plurality of payloads for the plurality of transmission cycles;
   multiplexing one or more payloads belonging to each of the plurality of classes for the each of the plurality of classes according to the classification information so as to generate a plurality of multiplexed payloads corresponding to each of the plurality of classes for every transmission cycle of each of the plurality of classes;
   applying a plurality of codes corresponding to each of the plurality of classes to the plurality of multiplexed payloads so as to generate a code division multiplexing symbol for every feedback cycle according to the transmission cycle of each of the plurality of classes;
   applying a scrambling code corresponding to a channel code to the code division multiplexing symbol; and
   transmitting the code division multiplexing symbol, to which the channel code is applied, to the base station through a wireless resource,
   wherein the channel allocation information further includes a plurality of transmission power information corresponding to each of the plurality of classes; and
   generating of the code division multiplexing symbol comprises:
   setting each of the plurality of classes so as to be transmitted according to the plurality of transmission power information.

2. The method of claim 1, wherein generating the code division multiplexing symbol further comprises:
   orthogonally modulating the plurality of multiplexed payloads so as to generate a plurality of orthogonally modulated multiplexed payloads corresponding to each of the plurality of multiplexed payloads, and
   applying the plurality of codes to the plurality of orthogonally modulated multiplexed payloads so as to generate the code division multiplexing symbol for every feedback cycle.

3. The method of claim 2, wherein generating the plurality of orthogonally modulated multiplexed payloads comprises:
   expanding the plurality of multiplexed payloads to have the same length, thereby generating a plurality of expanded multiplexed payloads, and
   orthogonally modulating the plurality of expanded multiplexed payloads so as to generate the plurality of orthogonally modulated multiplexed payloads.

4. The method of claim 3, further comprising:
   determining a predetermined number of repetitions by a ratio of the transmission cycle of each of the plurality of classes to the feedback cycle; and
   repeating the plurality of orthogonally modulated multiplexed payloads by the predetermined number of repetitions.

5. The method of claim 1, further comprising
determining the transmission cycle of each of the plurality of classes with a minimum value among the transmission cycles of one or more payloads belonging to each of the plurality of classes.

6. The method of claim 1, further comprising
determining the feedback cycle with a minimum value among the transmission cycles of the plurality of classes.

7. The method of claim 1, wherein multiplexing one or more payloads belonging to each of plurality of classes comprises:
determining the number of bits of each of the plurality of payloads belonging to each of the plurality of classes to be transmitted for every transmission cycle of each of the plurality of classes on the basis of the transmission cycles of one or more payloads belonging to each of the plurality of classes and the transmission cycle of each of the plurality of classes, and
merging bits corresponding to the number of bits of each of the plurality of payloads among one or more bits constituting the each of the plurality of payloads belonging to each of the plurality of classes so as to generate the plurality of multiplexed payloads.

8. The method of claim 7, wherein determining the number of bits comprises:
determining the number of bits on the basis of a ratio of the transmission cycle of each of the one or more payloads belonging to each of plurality of classes and the transmission cycle of each of plurality of classes.

9. The method of claim 1, wherein the plurality of payloads include a non-cyclic payload, and
a transmission cycle corresponding to the non-cyclic payload represents a maximum report rate indicating that the non-cyclic payload cannot be transmitted at an interval smaller than the corresponding transmission cycle, and
the method further comprises:
generating the non-cyclic payload on the basis of the transmission cycle corresponding to the non-cyclic payload, orthogonally modulating the non-cyclic payload, and
applying an additional channel code to the orthogonally modulated non-cyclic payload and transmitting the orthogonally modulated non-cyclic payload applied with the additional channel code to the base station through the wireless resource.

10. The method of claim 9, wherein the additional channel code is a code that corresponds to the channel code and is obtained by conjugating or sign reserving the scrambling code corresponding to the channel code.

11. The method of claim 10, wherein the plurality of payloads include an indicator payload informing presence/absence of transmission of the non-cyclic payload.

12. The method of claim 11, wherein the wireless resource includes a frame composed of a plurality of symbols on a time axis and a plurality of subcarriers on a frequency axis, and
the code division multiplexing symbol applied with the channel code or the additional channel code is transmitted to the base station through a partial area of the frame, and
wherein the transmitting comprises:
sequentially dividing the code division multiplexing symbol applied with the channel code or the additional channel code so as to generate a plurality of divided symbols and
transmitting the plurality of divided symbols to the base station through different subcarriers.

13. An apparatus for transmitting feedback information to a base station, comprising:
a receiver that receives feedback channel allocation information having a plurality of transmission cycles corresponding to each of a plurality of payloads regarding the feedback information and classification information regarding a plurality of classes to which the plurality of payloads belong;
a payload generator that generates the plurality of payloads for the plurality of transmission cycles;
a bit multiplexer that multiplexes one or more payloads belonging to each of the plurality of classes for the each of the plurality of classes according to the classification information so as to generate a plurality of multiplexed payloads corresponding to each of the plurality of classes for every transmission cycle of each of the plurality of classes;
a code multiplexer that applies a plurality of codes corresponding to each of the plurality of classes to the plurality of multiplexed payloads so as to generate a code division multiplexing symbol for every feedback cycle according to the transmission cycle of each of the plurality of classes;
a channel code application unit that applies a scrambling code corresponding to a channel code to the code division multiplexing symbol so as to generate a channel code applied symbol; and
a transmitter that transmits the channel code applied symbol to the base station through a wireless resource,
wherein the channel allocation information further includes a plurality of transmission power information sets corresponding to each of the plurality of classes, and the code multiplexer includes a power controller that controls such that each of the plurality of classes are transmitted according to the plurality of transmission power information sets.

* * * * *